United States Patent
Okazaki et al.

(10) Patent No.: US 12,291,481 B2
(45) Date of Patent: May 6, 2025

(54) METHOD FOR MANUFACTURING OPTICAL FIBER

(71) Applicant: SUMITOMO ELECTRIC INDUSTRIES, LTD., Osaka (JP)

(72) Inventors: Iwao Okazaki, Osaka (JP); Yuuki Shibuya, Osaka (JP); Keisei Morita, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 81 days.

(21) Appl. No.: 18/555,974

(22) PCT Filed: Mar. 31, 2022

(86) PCT No.: PCT/JP2022/016563
§ 371 (c)(1),
(2) Date: Oct. 18, 2023

(87) PCT Pub. No.: WO2022/224798
PCT Pub. Date: Oct. 27, 2022

(65) Prior Publication Data
US 2024/0199480 A1    Jun. 20, 2024

(30) Foreign Application Priority Data
Apr. 23, 2021 (JP) ................. 2021-073480

(51) Int. Cl.
*C03C 25/1065* (2018.01)
*C03C 25/20* (2006.01)
*C03C 25/26* (2018.01)

(52) U.S. Cl.
CPC .......... *C03C 25/1065* (2013.01); *C03C 25/20* (2013.01); *C03C 25/26* (2013.01)

(58) Field of Classification Search
CPC ...... C03C 25/1065; C03C 25/20; C03C 25/26
See application file for complete search history.

(56) References Cited

U.S. PATENT DOCUMENTS 6,076,376 A * 6/2000 Onishi .................. C03B 37/027
 65/402
2005/0259932 A1* 11/2005 Nagayama ......... G02B 6/03627
 385/123

(Continued)

FOREIGN PATENT DOCUMENTS

EP     0867413  *  9/1998  ........... C03B 37/029
EP     4289876  * 12/2023  ........... C08F 290/06

(Continued)

OTHER PUBLICATIONS

Khan, Zeeshan, et al., "Double-layer optical fiber coating analysis in MHD flow of an elastico-viscous fluid using wet-on-wet coating process". Results in Physics 7 (2017) 107-118.*

(Continued)

*Primary Examiner* — Bret P Chen
(74) *Attorney, Agent, or Firm* — IPUSA, PLLC

(57) ABSTRACT

A method for manufacturing an optical fiber coats a first resin on a glass fiber drawn from a glass base material, and cures the first resin to form a first coating. The method includes causing the glass fiber to travel at a first velocity during a first time period, increasing the velocity from the first velocity to a second velocity during a second time period following the first time period, and maintaining the velocity at the second velocity during a third time period following the second time period. A relationship $1.0<TB2/TB1<=11.0$ stands, where TB1 denotes a thickness of the first coating in the increasing, from a start of coating the first resin to a time when the velocity reaches a third velocity higher than the first velocity and lower than the second velocity, and TB2 denotes a thickness of the first coating in the maintaining.

9 Claims, 4 Drawing Sheets

(56) References Cited

U.S. PATENT DOCUMENTS

| | | | |
|---|---|---|---|
| 2006/0016393 A1* | 1/2006 | Fujimaki | B29D 11/00663 |
| | | | 118/420 |
| 2008/0276651 A1* | 11/2008 | Barish | C03B 37/01211 |
| | | | 65/407 |
| 2009/0241603 A1 | 10/2009 | Song | |
| 2011/0239709 A1* | 10/2011 | Okada | C03C 25/12 |
| | | | 65/432 |
| 2016/0229734 A1* | 8/2016 | Okada | C03B 37/0253 |
| 2018/0364437 A1* | 12/2018 | Tachibana | G02B 6/4403 |
| 2020/0278492 A1* | 9/2020 | Morita | G02B 6/0365 |
| 2020/0278493 A1* | 9/2020 | Ishikawa | G02B 6/02004 |
| 2020/0369554 A1* | 11/2020 | Saito | C03C 25/106 |

FOREIGN PATENT DOCUMENTS

| | | | | |
|---|---|---|---|---|
| JP | H04-187546 | | 7/1992 | |
| JP | 2001-66476 | * | 3/2001 | G02B 6/44 |
| JP | 2001-066476 | | 3/2001 | |
| JP | 2003-212606 | | 7/2003 | |
| JP | 2003-226556 | | 8/2003 | |
| JP | 2004-231427 | | 8/2004 | |
| JP | 2005-263545 | | 9/2005 | |
| JP | 2009-227522 | * | 10/2009 | C03C 25/10 |

OTHER PUBLICATIONS

Panoliaskos, A., et al., "Prediction of optical fiber coating thickness". Applied Optics, vol. 24, No. 15, Aug. 1, 1985, pp. 2309-2312.*

Zaretsky, E., et al., "The response of a glass fibers reinforced epoxy composite to an impact loading". International Journal of Solids and Structures 41 (2004) 569-584.*

Gao, Xiaodong, et al., "Epoxy resin composite containing nanocarbon-coated glass fiber and cloth for electromagnetic interference shielding". Journal of Materials Research and Technology 2021;13, 1759-1766.*

Haque, Ejaz, et al., "Scalable coating methods for enhancing glass fiber-epoxy interactions with cellulose nanocrystals". Cellulose (2021) 28:4685-4700.*

* cited by examiner

METHOD FOR MANUFACTURING OPTICAL FIBER

TECHNICAL FIELD

The present disclosure relates to methods for manufacturing optical fibers.

This application is based upon and claims priority to Japanese Patent Application No. 2021-073480 filed on Apr. 23, 2021, the entire contents of which are incorporated herein by reference.

BACKGROUND ART

A method for manufacturing an optical fiber is generally performed by drawing an optical fiber base material, coating a resin on an outer periphery of a glass fiber while forming the glass fiber, curing the resin by ultraviolet irradiation, and winding the glass fiber. After the drawing is started, a velocity (drawing speed) of the glass fiber increases, and the velocity of the glass fiber is maintained at a predetermined steady production drawing speed. In addition, the resin is coated on the glass fiber to a constant thickness. Patent Documents 1 and 2 describe examples of a method for drawing the optical fiber. For example, Patent Document 1 describes adjusting a supply pressure of the resin is adjusted according to the drawing speed.

PRIOR ART DOCUMENTS

Patent Documents

Patent Document 1: Japanese Laid-Open Patent Publication No. 2001-66476
Patent Document 2: Japanese Laid-Open Patent Publication No. 2003-226556

DISCLOSURE OF THE INVENTION

A method for manufacturing an optical fiber according to the present disclosure coats a first resin on a glass fiber drawn from a glass base material, and cures the first resin to form a first coating, and the method includes first step of causing the glass fiber to travel at a first velocity during a first time period; second step of increasing the velocity of the glass fiber from the first velocity to a second velocity during a second time period following the first time period; and third step of maintaining the velocity of the glass fiber at the second velocity during a third time period following the second time period, wherein TB2/TB1 is greater than 1.0 and less than or equal to 11.0, where TB1 denotes a thickness of the first coating in the second step, from a start of coating the first resin to a time when the velocity reaches a third velocity that is higher than the first velocity and lower than the second velocity, and TB2 denotes a thickness of the first coating in the third step.

MODE OF CARRYING OUT THE INVENTION

Figure 1:
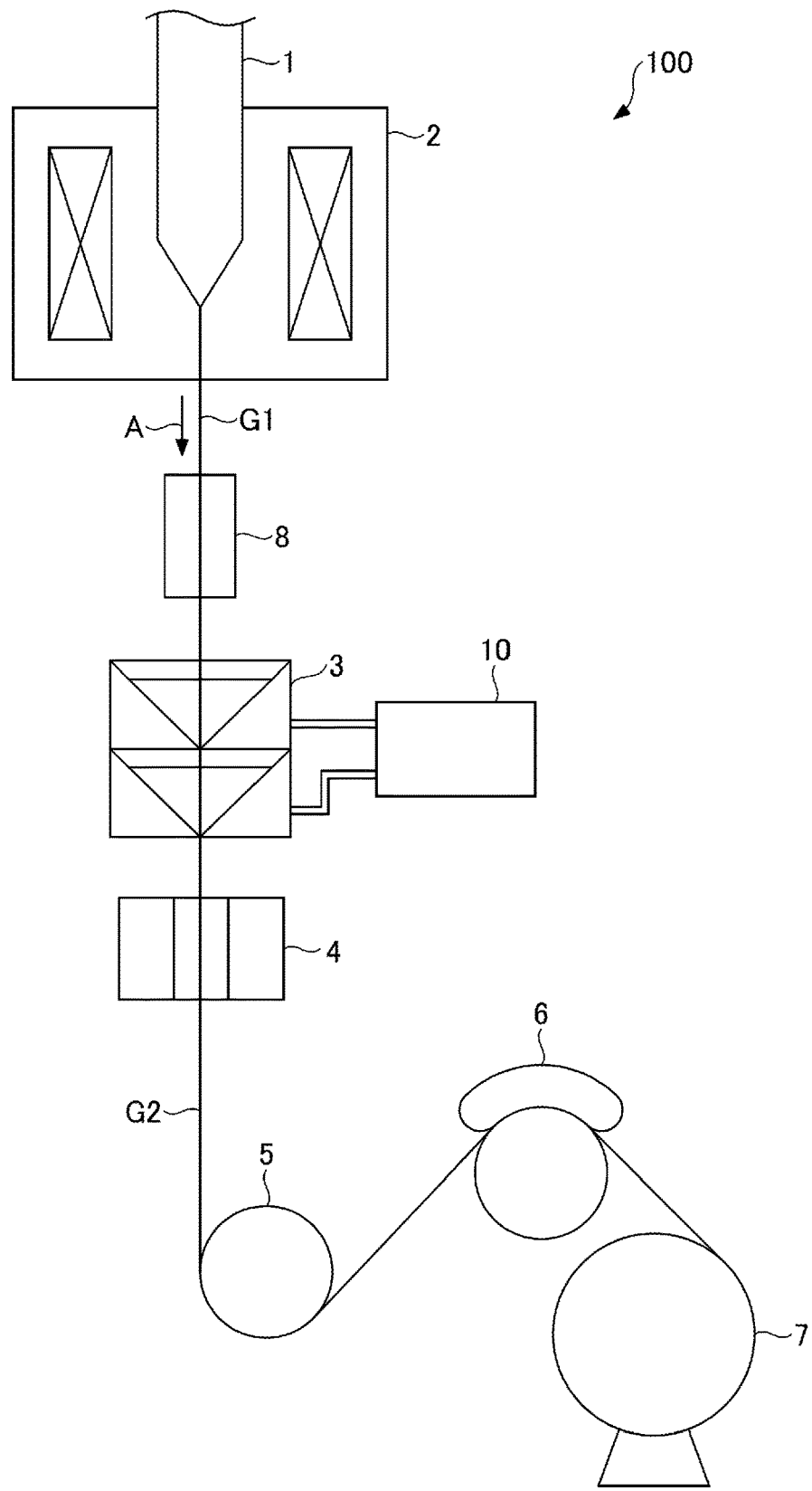
FIG. 1 is a schematic diagram illustrating an optical fiber manufacturing apparatus.

Problem to be Solved by the Present Disclosure

When drawing the optical fiber, until a velocity (drawing speed) of a glass fiber reaches a steady production drawing speed, transmission characteristics tend to deviate from a predetermined good range, and for this reason, this portion deviated from the predetermined good range is generally removed from a good portion of the optical fiber and disposed as a faulty portion. Accordingly, the resin, that is coated before the velocity of the glass fiber reaches the steady production drawing speed, is wasted. The waste of the resin can be eliminated by reducing an amount of the resin coated onto such a faulty portion, however, if the amount of the resin coated is simply reduced, the glass fiber becomes exposed to external air and easily damaged, and the glass fiber may break while the drawing speed increases. If the optical fiber breaks while the drawing speed increases, it becomes necessary to start over again from first dropping of an optical fiber base material, and a yield greatly deteriorates.

One object of the present disclosure is to provide a method for manufacturing an optical fiber capable of reducing a waste of a resin while avoiding breaking of the optical fiber.

Effects of the Present Disclosure

According to the present disclosure, it is possible to reduce the waste of the resin while avoiding the breaking of the optical fiber.

Modes for carrying out the invention will be described below.

Description of Embodiments of the Present Disclosure

First, embodiments of the present disclosure will be illustrated and described.

[1] According to one embodiment of the present disclosure, a method for manufacturing an optical fiber by coating a first resin on a glass fiber drawn from a glass base material, and curing the first resin to form a first coating, includes first step of causing the glass fiber to travel at a first velocity during a first time period, second step of increasing the velocity of the glass fiber from the first velocity to a second velocity during a second time period following the first time period, and third step of maintaining the velocity of the glass fiber at the second velocity during a third time period following the second time period, wherein TB2/TB1 is greater than 1.0 and less than or equal to 11.0, where TB1 denotes a thickness of the first coating in the second step, from a start of coating the first resin to a time when the velocity reaches a third velocity that is higher than the first velocity and lower than the second velocity, and TB2 denotes a thickness of the first coating in the third step.

A ratio of the thickness TB2 of the first coating in the third step, with respect to the thickness TB1 of the first coating in the second step from the start of coating the first resin to the time when the velocity reaches the third velocity that is higher than the first velocity and lower than the second velocity, is greater than 1.0. That is, an amount of the first resin coated on the glass fiber during the second step is smaller than an amount of the first resin coated on the glass fiber during the third step. Accordingly, it is possible to reduce an amount of the first resin included in a faulty portion that is removed from the optical fiber and reduce waste. In addition, when the ratio TB2/TB1 is less than or equal to 11.0, it is possible to prevent breaking of the glass fiber while the velocity of the glass fiber increases, even if the amount of the first resin is reduced, as is evident from an experiment conducted by the present inventors.

[2] In [1], the thickness of the first coating may be adjusted in the second step by adjusting a coating pressure of the first resin on the glass fiber. In this case, it is possible to easily adjust the thickness of the first resin with a high accuracy.

[3] In [1] or [2], the coating of the first resin on the glass fiber may start in the second step when the velocity of the glass fiber is less than equal to 0.2 times the second velocity. In this case, it is possible to easily prevent air bubbles from becoming trapped between the first resin and the glass fiber.

[4] In any one of [1] to [3], the third velocity may be less than or equal to 0.95 times the second velocity. In this case, it is possible to easily and stably coat the first resin during a time period from the time when the velocity of the glass fiber reaches the third velocity to the time when the velocity of the glass fiber reaches the second velocity, and to easily prevent the breaking.

[5] In any one of [1] to [4], an amount of increase of the thickness of the first coating per 10 seconds, from the time when the velocity of the glass fiber reaches the third velocity to the time when the velocity of the glass fiber reaches the second velocity, may be 1.00 µm at a maximum. In this case, it is possible to easily and stably coat the first resin, and to easily prevent the breaking.

[6] In any one of [1] to [5], the first step may include step of threading a tip end of the glass fiber, via a first die and a second die, to a takeoff device disposed on a downstream side of the second die in a traveling direction of the glass fiber, and the second step may include step of coating a second resin on an outer periphery of the glass fiber by the second die, and step of winding the tip end of the glass fiber coated with the second resin on a winding device disposed on a downstream side of the takeoff device in the traveling direction of the glass fiber. In this case, the tip end of the glass fiber can be hung on the takeoff device and the winding device at the start of the drawing.

[7] In [6], the first die may be filled with the first resin before the step of winding, and the first resin may be coated on the glass fiber in the step of winding. In this case, it becomes unnecessary to replace the first die every time the glass base material is replaced, and even if air bubbles are mixed to the first resin inside the first die, it is possible to easily remove the air bubbles while the velocity of the glass fiber increases.

[8] In [6] or [7], the second die may be filled with the second resin before the step of winding, and the second resin may be coated on the glass fiber in the step of winding. In this case, it is unnecessary to replace the second die every time the glass base material is replaced, and even if air bubbles are mixed to the second resin inside the second die, it is possible to easily remove the air bubbles while the velocity of the glass fiber increases.

[9] According to another embodiment of the present disclosure, a method for manufacturing an optical fiber by coating a first resin on a glass fiber drawn from a glass base material, and curing the first resin to form a first coating, includes first step of causing the glass fiber to travel at a first velocity during a first time period, second step of increasing the velocity of the glass fiber from the first velocity to a second velocity during a second time period following the first time period, and third step of maintaining the velocity of the glass fiber at the second velocity during a third time period following the second time period, wherein TB2/TB1 is greater than 1.0 and less than or equal to 11.0, where TB1 denotes a thickness of the first coating in the second step, from a start of coating the first resin to a time when the velocity reaches a third velocity that is higher than the first velocity and lower than the second velocity, and TB2 denotes a thickness of the first coating in the third step, the second step includes step of starting the coating of the first resin on the glass fiber when the velocity of the glass fiber is less than or equal to 0.2 times the second velocity, and an increase in the thickness of the first coating per 10 seconds, from the time when the velocity of the glass fiber reaches the third velocity to a time when the velocity of the glass fiber reaches the second velocity, is 1.00 µm at a maximum.

When the ratio TB2/TB1 is greater than 1.0 and less than or equal to 11.0, it is possible to reduce waste of the resin while avoiding breaking of the optical fiber. In addition, it is possible to easily prevent air bubbles from becoming trapped between the first resin and the glass fiber. Further, it is possible to easily and stably coat the first resin, and prevent breaking of the optical fiber.

Details of Embodiments of Present Disclosure

Hereinafter, embodiments of the present disclosure will be described in detail, but the present disclosure is not limited thereto. In the present specification and drawings, constituent elements having substantially the same functional configuration are designated by the same reference numerals, and a redundant description thereof may be omitted.

First, an optical fiber manufacturing apparatus suitable for performing a method for manufacturing an optical fiber according to one embodiment will be described. FIG. 1 is a schematic diagram illustrating the optical fiber manufacturing apparatus.

As illustrated in FIG. 1, in an optical fiber manufacturing apparatus 100, an optical fiber base material 1 is first heated in a drawing furnace 2, so that a lower end of the optical fiber base material 1 is melted and drawn. A glass fiber G1 formed by the drawing passes through a resin coating device 3 via a cooling device 8 that is provided on a downstream side of the drawing furnace 2 in a traveling direction of the glass fiber G1 (direction of an arrow A in FIG. 1). An outer diameter of the glass fiber G1 is adjusted to be smaller than a first die hole 31a of a first die 31 and a second die hole 32a of a second die 32, which will be described later. The optical fiber base material 1 is an example of a glass base material.

A resin supplying device 10 for supplying a resin to be coated on the glass fiber G1 is connected to the resin coating device 3. When the glass fiber G1 passes through the resin coating device 3, two layers of the resin are coated on an outer periphery of the glass fiber G1.

The glass fiber G1, coated with the resin, passes through a resin curing device 4 (for example, an ultraviolet irradiation device or the like) provided on a downstream side of the resin coating device 3, so that the resin is cured to form an optical fiber G2. The optical fiber G2 is wound around a winding drum 7 via a guide roller 5 and a capstan 6. The capstan 6 is an example of a takeoff device, and the winding drum 7 is an example of a winding device.

Figure 2:
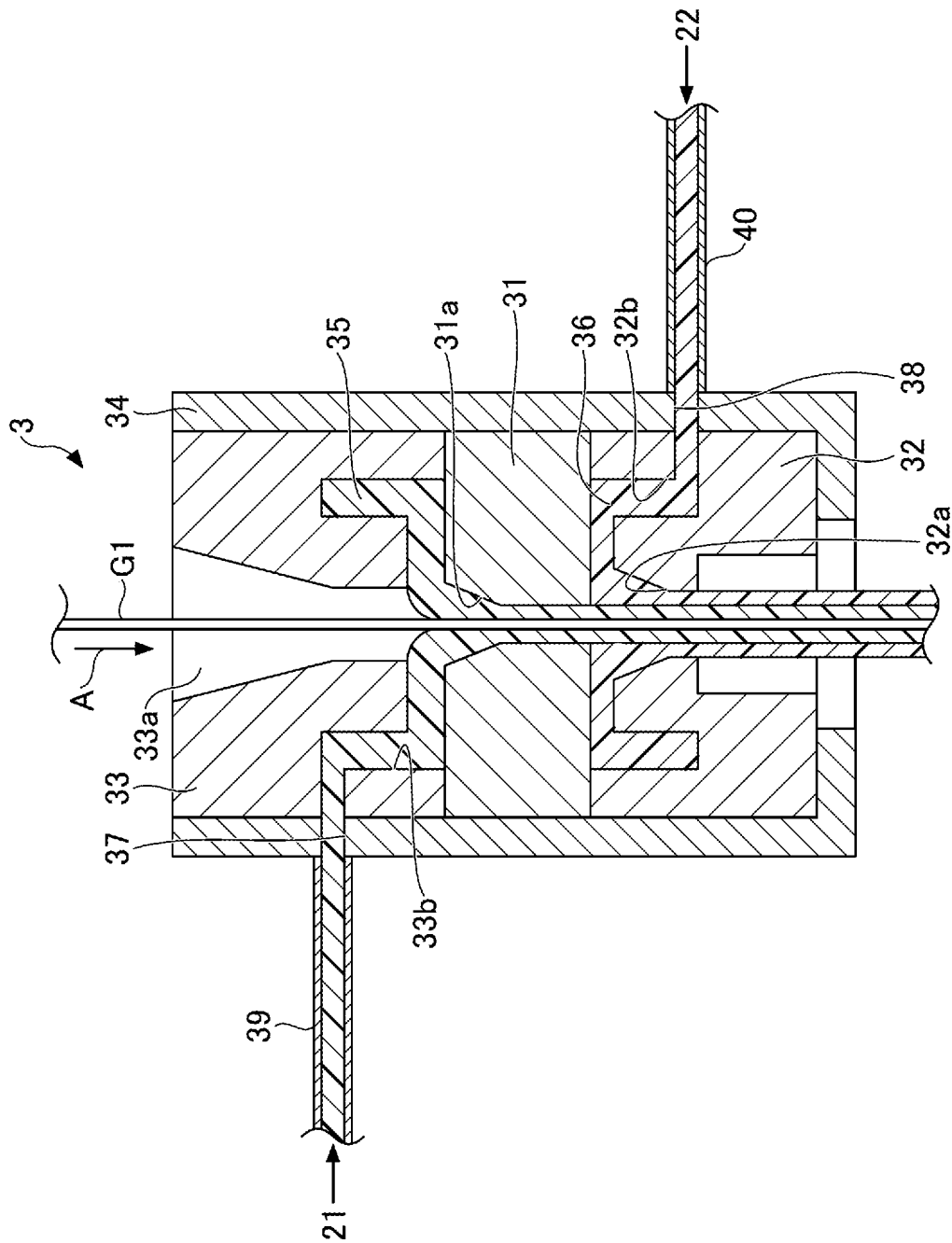
FIG. 2 is a cross sectional view of a resin coating apparatus.

Next, the resin coating device 3 will be described. FIG. 2 is a cross sectional view of an example of the resin coating apparatus.

As illustrated in FIG. 2, the resin coating device 3 includes the first die 31 that coats the outer periphery of the glass fiber G1 with a first resin 21, and the second die 32 that coats an outer periphery of the first resin 21 with a second resin 22. For example, the first die 31 and the second die 32 are integrally assembled. Although the resin coating device 3 is a device that coats the first and second resins 21 and 22 together around the glass fiber G1 in one process, the first and second resins 21 and 22 may be coated separately.

The first die 31 is formed to an approximately cylindrical shape, and the first die hole 31a for allowing the glass fiber G1 and the first resin 21 to pass through is provided at a central portion of the first die 31. For example, an upstream side of the first die hole 31a is formed to a tapered shape, and a downstream side of the first die hole 31a is formed to a cylindrical shape.

The second die 32 is formed to an approximately cylindrical shape, and the second die hole 32a for allowing the glass fiber G1 coated with the first resin 21 and the second resin 22 to pass through is provided at a central portion of the second die 32. For example, an upstream side of the second die hole 32a is formed to a tapered shape, and a downstream side of the second die hole 32a is formed to a cylindrical shape. The second die 32 is disposed on a downstream side of the first die 31. A second connection flow passage 32b, forming a portion of a flow passage configured to flow the second resin 22, is formed on an upper portion of the second die 32. The second connection flow passage 32b is formed so as to be continuous with the second die hole 32a.

A nipple 33 for guiding the glass fiber G1 to the first die 31 is provided on an upstream side of the first die 31. The nipple 33 is formed to an approximately cylindrical shape, and a tapered through hole 33a through which the glass fiber G1 passes is provided at a central portion of the nipple 33. In addition, a first connection flow passage 33b, forming a portion of a flow passage through which the first resin 21 flows, is formed on a lower portion of the nipple 33. The first connection flow passage 33b is formed so as to be continuous with the through hole 33a.

A cylindrical die holder 34 is provided on outer peripheries of the nipple 33, the first die 31, and the second die 32. The nipple 33, the first die 31, and the second die 32 are fit and accommodated inside the die holder 34 in a state where no gap is formed between an inner peripheral surface of the die holder 34 and outer peripheral surfaces of the nipple 33, the first die 31, and the second die 32. In this accommodated state, a gap formed between the first connection flow passage 33b of the nipple 33 and an upper surface of the first die 31 functions as a first resin flow passage 35 through which the first resin 21 flows. In addition, a gap formed between a lower surface of the first die 31 and the second connection flow passage 32b of the second die 32 functions as a second resin flow passage 36 through which the second resin 22 flows. A through hole 37 communicating with the first resin flow passage 35, and a through hole 38 communicating with the second resin flow passage 36, are formed in a sidewall of the die holder 34. The second resin flow passage 36 is located on a downstream side of the first resin flow passage 35 in the traveling direction of the glass fiber G1.

A tip end of a first resin supply pipe 39 for supplying the first resin 21 is connected to the through hole 37. A base end of the first resin supply pipe 39 is connected to a first resin supply source of the resin supplying device 10 (refer to FIG. 1). A tip end of a second resin supply pipe 40 for supplying the second resin 22 is connected to the through hole 38. A base end of the second resin supply pipe 40 is connected to a second resin supply source of the resin supplying device 10. The first resin 21 is supplied from the resin supplying device 10 to the first resin flow passage 35 via the first resin supply pipe 39 and the through hole 37, and the second resin 22 is supplied from the resin supplying device 10 to the second resin flow passage 36 via the second resin supply pipe 40 and the through hole 38. Then, the first resin 21 is coated on the glass fiber G1 using the first die 31 having the first resin flow passage 35 filled with the first resin 21, and the second resin 22 is coated on the glass fiber G1 using the second die 32 having the second resin flow passage 36 filled with the second resin 22. The first resin 21 and the second resin 22 are ultraviolet curable resins, for example, and are cured by irradiating ultraviolet rays after being coated.

Figure 3:
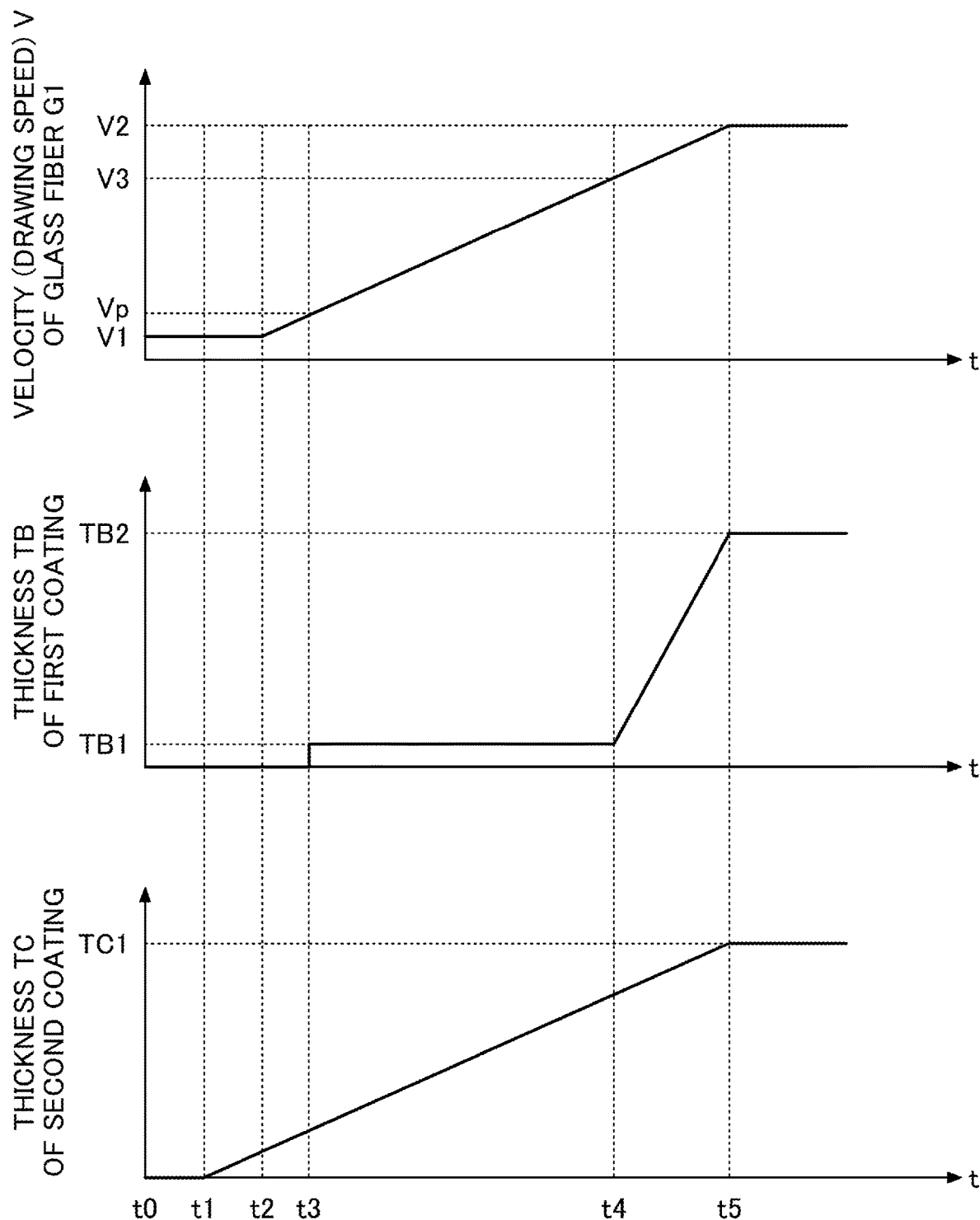
FIG. 3 is a diagram illustrating, together, a change in a velocity of a glass fiber, and changes in thicknesses of a first resin and a second resin in a method for manufacturing the optical fiber according to one embodiment.

Next, a method for manufacturing an optical fiber according to one embodiment will be described in detail. In the present embodiment, the optical fiber G2 having a good portion in which a first coating having a thickness TB equal to a thickness TB2 is provided around the glass fiber G1, and a second coating having a thickness TC equal to a thickness TC1 is provided around the first coating, is manufactured. As described above, the optical fiber manufactured before the steady manufacturing drawing speed is reached becomes a faulty portion. FIG. 3 is a diagram illustrating, together, a change in the velocity (drawing speed) V of the glass fiber and changes in the thicknesses of the first coating and the second coating coated on the glass fiber in the method for manufacturing the optical fiber according to the embodiment. In FIG. 3, the abscissa indicates a time t. The velocity V of the glass fiber G1 in FIG. 3 is the velocity in the resin coating device 3. The thickness TB of the first coating and the thickness TC of the second coating in FIG. 3 are the thicknesses after the resin is coated by the resin coating device 3 and cured by the resin curing device 4.

First, a change in the velocity V of the glass fiber G1 will be described. In the present embodiment, it is assumed that the tip end of the glass fiber G1 hangs on the capstan 6 via the cooling device 8, the resin coating device 3, the resin curing device 4, and the guide roller 5 at a time t0, the glass fiber G1 is drawn from the lower end of the optical fiber base material 1, and the velocity V of the glass fiber G1 is maintained at a velocity V1 until a time t2. The velocity V1 need not be constant, and may vary slightly. The time t1 is a time when the coating of the second resin 22 starts, as will be described later, and after the time t1, the optical fiber G2 coated with the resin hangs from the capstan 6 to the winding drum 7 and is wound around the winding drum 7. Thereafter, the velocity V of the glass fiber G1 increases to a velocity V2 during a time period from the time t2 to a time t5. After the time t5, the velocity V of the glass fiber G1 is maintained at the velocity V2. The velocity V2 is a steady production drawing speed, and after the time t5, the optical fiber G2 is wound as a good portion. The velocity V2 is greater than or equal to approximately 2000 m/min and less than or equal to approximately 3000 m/min, for example. In addition, the optical fiber G2 wound during a time period from the time t0 to the time t5 is disposed as a faulty portion in a subsequent process. A time period from the time t0 to the time t2 is an example of a first duration, a time period from the time t2 to the time t5 is an example of a second duration, and a time period after the time t5 is an example of a third duration. Moreover, the velocity V1 is an example of a first velocity, and the velocity V2 is an example of a second velocity.

Next, changes in the thickness TB of the first coating and the thickness TC of the second coating will be described. The first resin 21 and the second resin 22 are not coated during the time period from the time t0 to the time t1. Thereafter, the coating of the second resins 22 starts from the time t1. A coating amount of the second resin 22 increases during the time period from the time t1 to the time t5, so that the thickness TC of the second coating reaches the thickness TC1 at the time t5. The coating of the first resin 21 is not started at the time t1, and the coating of the first resin 21 is started from a time t3 after the time t2. Accordingly, during the time period from the time t1 to the time t3, the second resin 22 is coated directly on the glass fiber G1.

During a time period from the time t3 to the time t5, until a time t4 when the velocity V of the glass fiber G1 becomes a velocity V3 that is higher than the velocity V1 and lower than the velocity V2, the coating amount of the first rein 21 is adjusted so that the thickness TB of the first coating becomes the thickness TB1. A relationship "1.0<TB1/TB2<=11.0" stands between the thickness TB1 and the thickness TB2. In other words, a ratio of the thickness TB1 to the thickness TB2 is greater than 1.0 and less than or equal to 11.0. When the coating of the first resin 21 starts from the time t3, the first resin 21 is coated directly on the glass fiber G1, and the second resin 22 is coated on the first resin 21. That is, the first resin 21 and the second resin 22 are coated together on the glass fiber G1. The thickness TB1 does not need to be constant, and may vary as long as the relationship "1.0<TB2/TB1<=11.0" stands. For example, the thickness TB1 may be controlled to gradually increase. The velocity V3 is an example of a third velocity.

Thereafter, the coating amount of the first resin 21 increases during the time period from the time t4 to the time t5, so that the thickness TB of the first coating reaches the thickness TB2 at the time t5.

Figure 4:
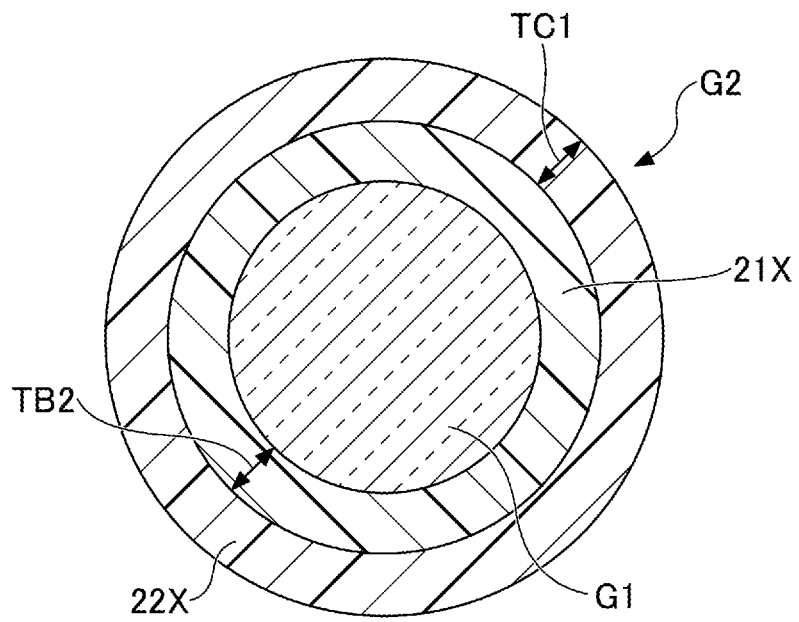
FIG. 4 is a cross sectional view of the optical fiber at a time of manufacturing a good portion.

After the time t5, the velocity V of the glass fiber G1 is maintained at the velocity V2, the thickness TB of the first coating is maintained to the thickness TB2, and the thickness TC of the second coating is maintained to the thickness TC1. That is, after the time t5, the good portion of the optical fiber G2 is manufactured at the steady manufacturing drawing speed. FIG. 4 is a cross sectional view of the optical fiber G2 at the time of manufacturing the good portion. In FIG. 4, the first coating in the good portion is designated by a reference numeral 21X, and the second coating in the good portion is designated by a reference numeral 22X.

The first resin 21 and the second resin 22 coated on the glass fiber G1 are cured by the ultraviolet irradiation in the resin curing device 4. The amounts of the first resin 21 and the second resin 22 coated and the thicknesses thereof during the time period from the time t1 to time t5 are smaller than the amounts of the first resin 21 and the second resin 22 coated and the thicknesses thereof after the time t5. For this reason, power of the ultraviolet rays for curing the first resin 21 and the second resin 22 coated during the time period from the time t1 to time t5 may be set lower than the power of the ultraviolet rays for curing the first resin 21 and the second resin 22 coated after the time t5. By lowering the power, it is possible to obtain effects, such as a reduction in power consumption, a longer life of an ultraviolet source, a reduced fogging of a quartz pipe in the resin curing device 4, or the like.

In the optical fiber G2 manufactured according to the present embodiment, the first resin 21 is not coated during the time period from the time t0 to the time t3, and the relationship "1.0<TB2/TB1" stands between the thickness TB1 and the thickness TB2 during the time period from the time t3 to the time t4, so that the coating amount of the first resin 21 can be small. Accordingly, the coating amount of the first resin 21 included in the faulty portion can be reduced, but in order to reduce wasting of the resin, TB2/TB1 is preferably greater than 2.0, and more preferably greater than 5.0. In addition, as will be described later, because the relationship "TB1/TB2<=11.0" stands between the thickness TB1 of the first coating in the faulty portion and the thickness TB2 of the first coating in the good portion, it is possible to reduce breaking of the optical fiber G2 while reducing the coating amount of the first resin 21 included in the faulty portion.

Although the glass fiber is passed through the die and coated with the resin before the die is filled with the resin in the method described above, the glass fiber may be threaded in a state where the first die 31 is filled with the first resin 21 and the second die 32 is filled with the second resin 22. Normally, the die replaced every time the glass base material is replaced, but by doing so, it becomes necessary to replace the first die 31 and the second die 32 when drawing the next glass base material, and a high operation ratio can be maintained in the optical fiber manufacturing apparatus 100. In addition, the first resin 21 may be thinly coated on the glass fiber G1 at the time of the threading. By doing so, even if air bubbles are mixed to the first resin 21 inside the first die 31, the air bubbles are easily removed while the drawing speed increases. Similarly, the second resin 22 may be thinly coated on the glass fiber G1 at the time of the threading. By doing so, even if air bubbles are mixed to the second resin 22 inside the second die 32, the air bubbles are easily removed while the drawing speed increases.

The thickness TB of the first coating can be adjusted according to coating conditions of the first resin 21 in the resin coating device 3, for example. When adjusting the thickness TB of the first coating, it is particularly preferable to adjust a coating pressure. This is because the thickness TB can easily be adjusted with a high accuracy in this case. Moreover, the thickness TB of the first coating may be adjusted by varying cooling conditions in the cooling device 8, or may be adjusted by varying the cooling conditions in the cooling device 8 and the coating conditions of the first resin 21 in the resin coating device 3.

If the velocity V of the glass fiber G1 is too high when starting the coating of the first resin 21, air bubbles are easily trapped between the glass fiber G1 and the first resin 21, the glass fiber is easily damaged, and the glass fiber may break. For example, in a case where the velocity V of the glass fiber G1 exceeds 0.2 times the velocity V2 at the time of coating the first resin 21, the break may easily occur. For this reason, a velocity Vp of the glass fiber G1 at the time t3 when the coating of the first resin 21 starts is preferably less than or equal to 0.2 times the velocity V2. In other words, the coating of the first resin 21 on the glass fiber G1 is preferably started when the velocity V of the glass fiber G1 is less than or equal to 0.2 times the velocity V2. Further, the velocity Vp of the glass fiber G1 at the time t3 when the coating of the first resin 21 starts is more preferably less than or equal to 0.1 times the velocity V2. A lower limit value of the velocity Vp is the velocity V1.

In addition, in a case where a difference between the velocity V3 and the velocity V2 is small, a time period during which the velocity V increases from the velocity V3 to the velocity V2, that is, the time period between the time t4 and the time t5, becomes short. For this reason, in a case where the thickness TB1 of the first coating at the time t4 is significantly smaller than the thickness TB2, and is approximately 0.1 times the thickness TB2, for example, the thickness TB of the first coating is increased from the thickness TB1 to the thickness TB2 in a short period of time, and the coating of the first resin 21 may become unstable to cause a break to occur. For example, in a case where the velocity V3 is greater than 0.95 times the velocity V2, the break may easily occur. For this reason, the velocity V3 is preferably less than or equal to 0.95 times, more preferably less than or equal to 0.90 times, and still more preferably less than or equal to 0.80 times the velocity V2. In order to obtain the effect of reducing the waste of the resin, the velocity V3 is preferably greater than or equal to approximately 0.5 times the velocity V2.

Moreover, from a viewpoint of preventing the breaking, an amount of increase in the thickness TB of the first coating per 10 seconds is preferably 1.00 μm at a maximum, more preferably less than or equal to 0.80 μm, and still more preferably less than or equal to 0.60 μm. For example, even if the first resin 21 is supplied in a stepwise manner, and there is an instant when the thickness TB of the first coating rapidly increases, it is preferable that the amount of increase in 10 seconds, including the instant, is less than or equal to 1.00 μm. In order to obtain the effect of reducing the waste of the resin, the amount of increase in the thickness TB of the first coating per 10 seconds is preferably greater than or equal to 0.10 μm.

Although the thickness TB of the first coating and the thickness TC of the second coating change linearly in FIG. 3, the changes in the thickness TB of the first coating and the thickness TC of the second coating may be other than linear.

Next, the experiment conducted by the present inventors will be described.

Figure 5:
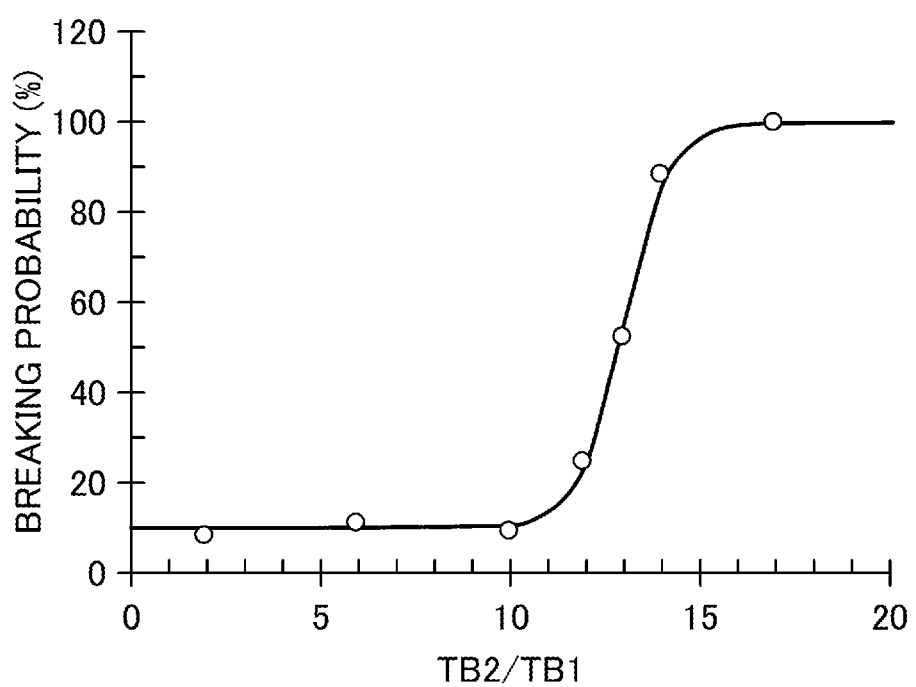
FIG. 5 is a diagram illustrating a relationship between a thickness ratio and a breaking probability.

In this experiment, optical fibers were manufactured under a plurality of conditions in which the ratio (TB2/TB1) of the thickness TB2 to the thicknesses TB1 were varied, by a method similar to the embodiment described above. Then, a breaking probability was checked for each of the plurality of conditions. The breaking probability refers to a ratio (%) of the number of times the breaking occurred while the drawing speed increases. The results are illustrated in FIG. 5. In FIG. 5, the abscissa indicates the ratio (TB2/TB1) of the thickness TB2 to the thickness TB1, and the ordinate indicates the breaking probability.

As illustrated in FIG. 5, in a case where the ratio (TB2/TB1) is less than or equal to 11.0, the breaking probability was less than or equal to 20% and low. In addition, in a case where the ratio (TB2/TB1) is less than or equal to 10.0, the breaking probability was less than or equal to approximately 10% and even lower. Accordingly, the ratio (TB2/TB1) is preferably less than or equal to 10.0.

Although the embodiments are described above in detail, the present disclosure is not limited to a specific embodiment, and various variations and modifications can be made without departing from the scope described in the claims.

DESCRIPTION OF REFERENCE NUMERALS

1: Optical fiber base material
2: Drawing furnace
3: Resin coating device
4: Resin curing device
5: Guide roller
6: Capstan
7: Drum
8: Cooling device
10: Resin supplying device
21: First resin
21X: First coating
22: Second resin
22X: Second coating
31: First die
31a: First die hole
32: Second die
32a: Second die hole
32b: Second connection flow passage
33: Nipple
33a: Hole
33b: First connection flow passage
34: Die holder
35: First resin flow passage
36: Second resin flow passage
37: Through hole
38: Through hole
39: First resin supply pipe
40: Second resin supply pipe
100: Manufacturing apparatus
A: Arrow
G1: Glass fiber
G2: Optical fiber
TC1, TB1, TB2: Thickness

The invention claimed is:
1. A method for manufacturing an optical fiber by coating a first resin on a glass fiber drawn from a glass base material, and curing the first resin to form a first coating, the method comprising:
  causing the glass fiber to travel at a first velocity during a first time period;
  increasing the velocity of the glass fiber from the first velocity to a second velocity during a second time period following the first time period; and
  maintaining the velocity of the glass fiber at the second velocity during a third time period following the second time period,
  wherein TB2/TB1 is greater than 1.0 and less than or equal to 11.0, where TB1 denotes a thickness of the first coating in the increasing, from a start of coating the first resin to a time when the velocity reaches a third velocity that is higher than the first velocity and lower than the second velocity, and TB2 denotes a thickness of the first coating in the maintaining.
2. The method for manufacturing the optical fiber as claimed in claim 1, wherein the thickness of the first coating is adjusted in the increasing by adjusting a coating pressure of the first resin on the glass fiber.
3. The method for manufacturing the optical fiber as claimed in claim 1, wherein the coating of the first resin on the glass fiber starts in the increasing when the velocity of the glass fiber is less than equal to 0.2 times the second velocity.
4. The method for manufacturing the optical fiber as claimed in claim 1, wherein the third velocity is less than or equal to 0.95 times the second velocity.
5. The method for manufacturing the optical fiber as claimed in claim 1, wherein an amount of increase of the thickness of the first coating per 10 seconds, from a time when the velocity of the glass fiber reaches the third velocity to a time when the velocity of the glass fiber reaches the second velocity, is 1.00 μm at a maximum.
6. The method for manufacturing the optical fiber as claimed in claim 1, wherein
  the causing includes threading a tip end of the glass fiber, via a first die and a second die, to a takeoff device disposed on a downstream side of the second die in a traveling direction of the glass fiber, and the increasing includes
coating a second resin on an outer periphery of the glass fiber by the second die, and
winding the tip end of the glass fiber coated with the second resin on a winding device disposed on a downstream side of the takeoff device in the traveling direction of the glass fiber.

7. The method for manufacturing the optical fiber as claimed in claim 6, wherein
the first die is filled with the first resin before the winding, and
the first resin is coated on the glass fiber in the winding.

8. The method for manufacturing the optical fiber as claimed in claim 6, wherein
the second die is filled with the second resin before the winding, and
the second resin is coated on the glass fiber in the winding.

9. A method for manufacturing an optical fiber by coating a first resin on a glass fiber drawn from a glass base material, and curing the first resin to form a first coating, the method comprising:
causing the glass fiber to travel at a first velocity during a first time period;
increasing the velocity of the glass fiber from the first velocity to a second velocity during a second time period following the first time period; and
maintaining the velocity of the glass fiber at the second velocity during a third time period following the second time period, wherein
TB2/TB1 is greater than 1.0 and less than or equal to 11.0, where TB1 denotes a thickness of the first coating in the increasing, from a start of coating the first resin to a time when the velocity reaches a third velocity that is higher than the first velocity and lower than the second velocity, and TB2 denotes a thickness of the first coating in the maintaining,
the increasing includes starting the coating of the first resin on the glass fiber when the velocity of the glass fiber is less than or equal to 0.2 times the second velocity, and
an increase in the thickness of the first coating per 10 seconds, from the time when the velocity of the glass fiber reaches the third velocity to a time when the velocity of the glass fiber reaches the second velocity, is 1.00 μm at a maximum.

\* \* \* \* \*